Figure 9:
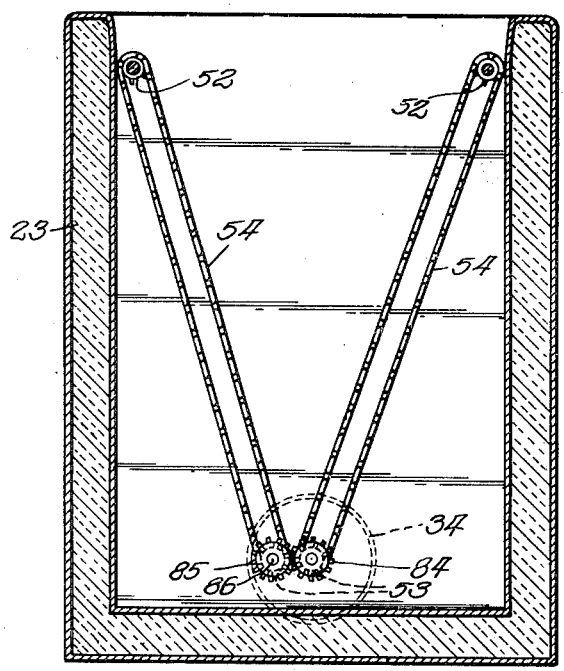

Aug. 2, 1949.  M. F. WEBER  2,478,145
REFRIGERATED FOOD STORAGE UNIT APPARATUS
Filed June 14, 1946  7 Sheets-Sheet 1
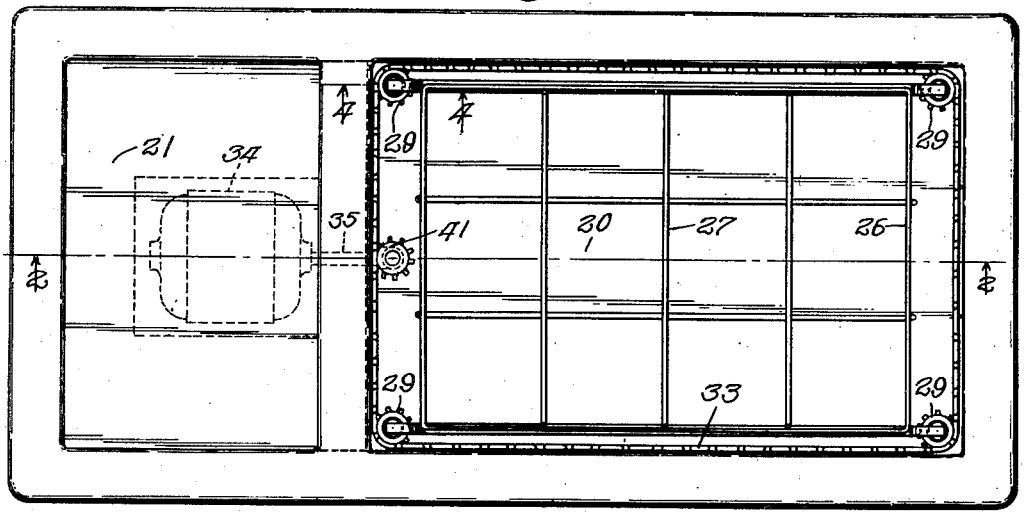
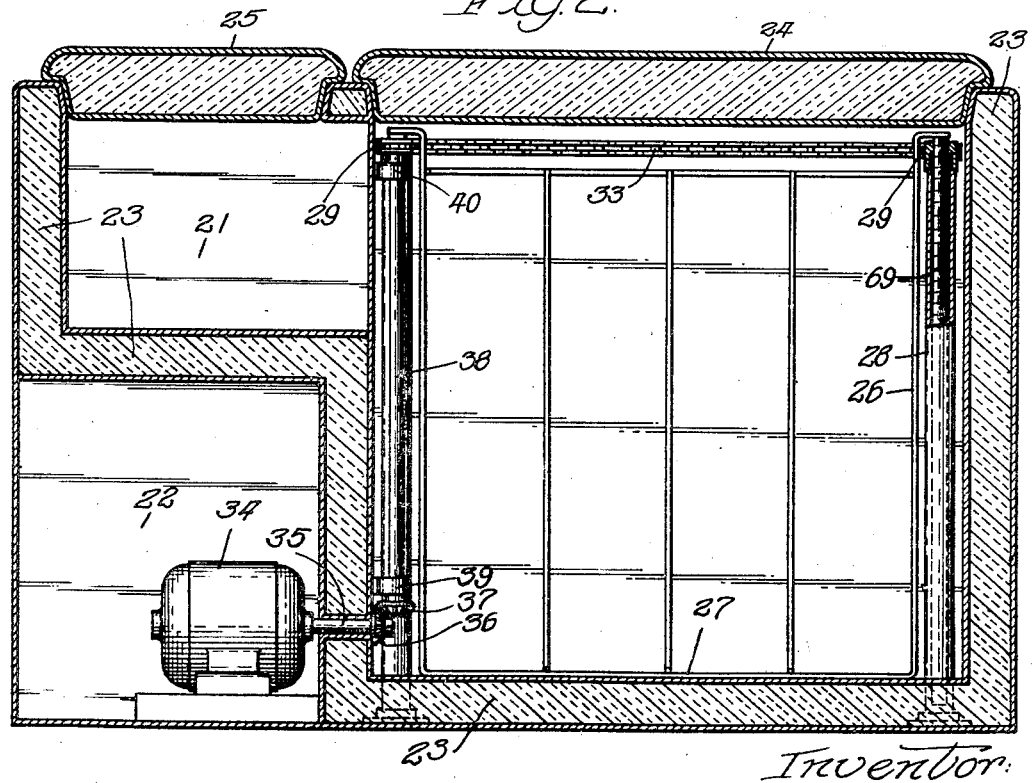
Inventor:
Marcie F. Weber,
By [signature]
Attys.

Aug. 2, 1949. M. F. WEBER 2,478,145
REFRIGERATED FOOD STORAGE UNIT APPARATUS
Filed June 14, 1946 7 Sheets-Sheet 2
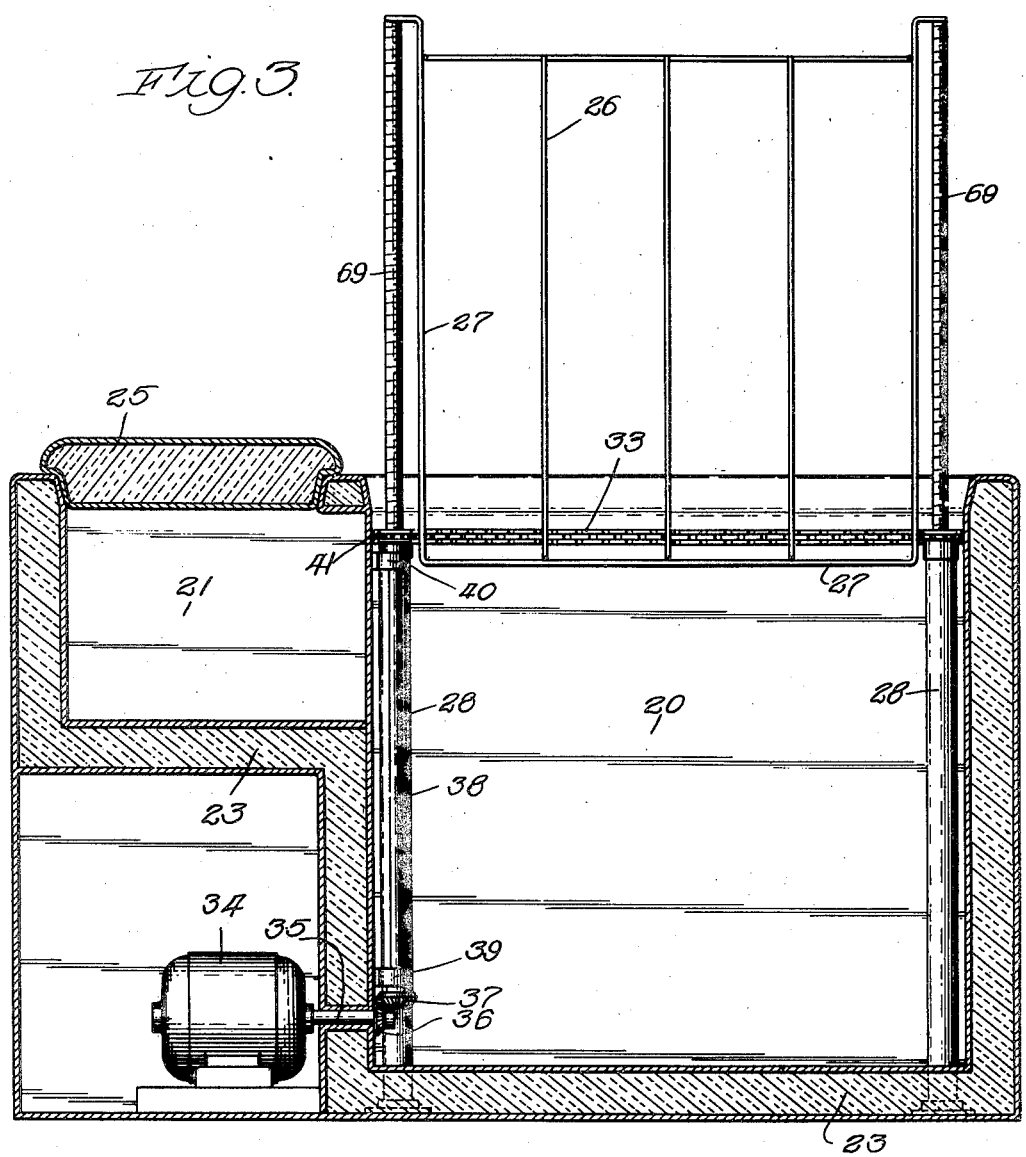
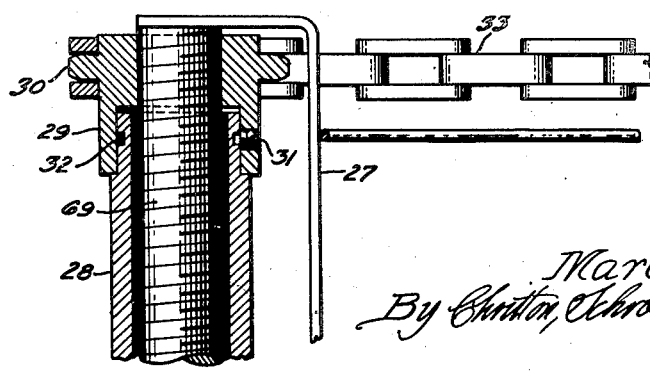
Inventor:
Marcie F. Weber,
By Chritton, Schroeder, Merriam, Hofgren,
Attys.

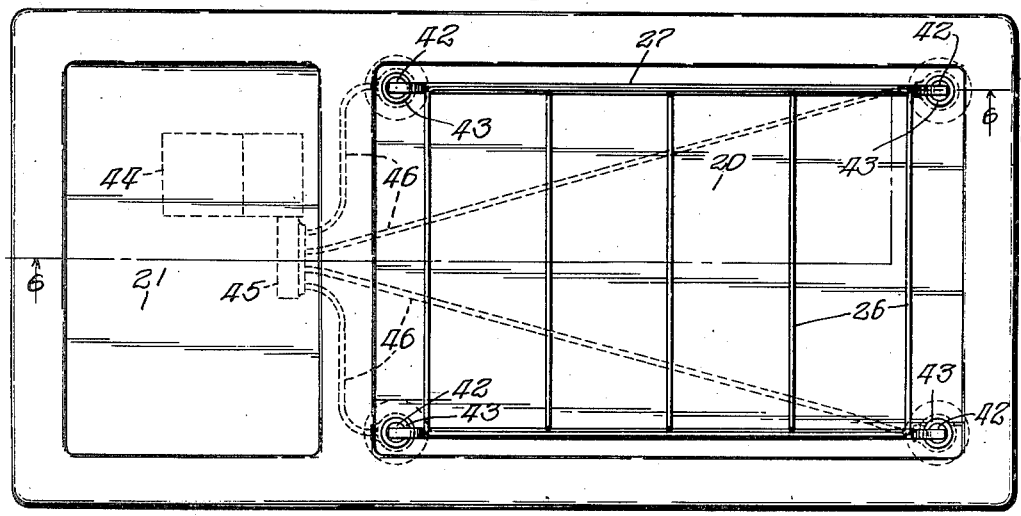
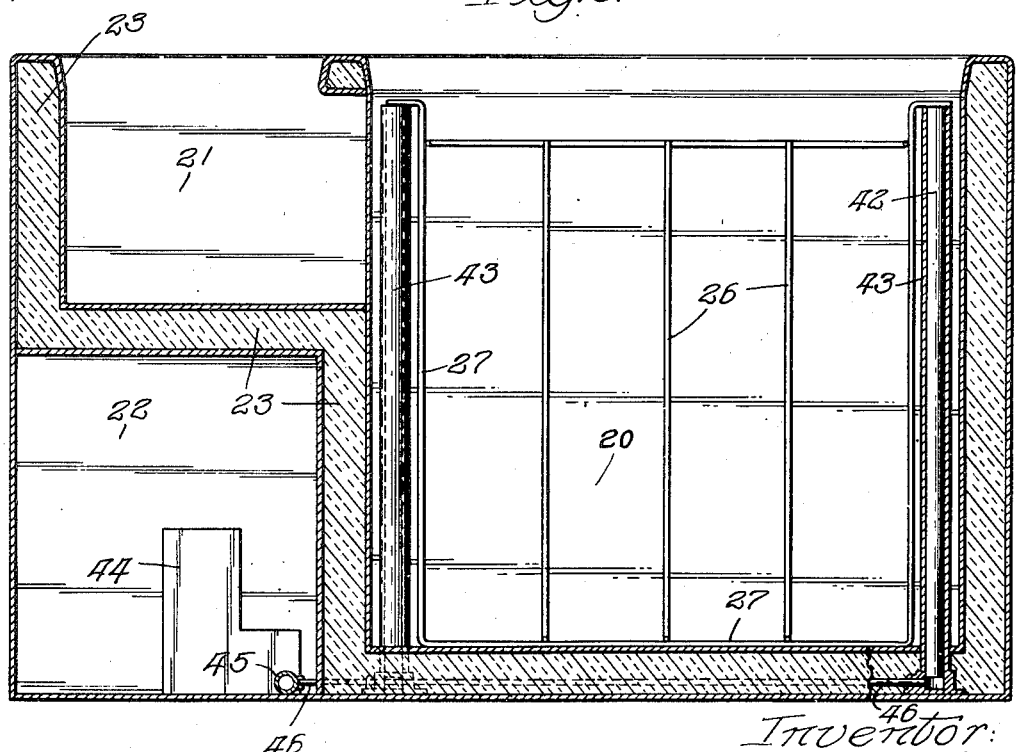

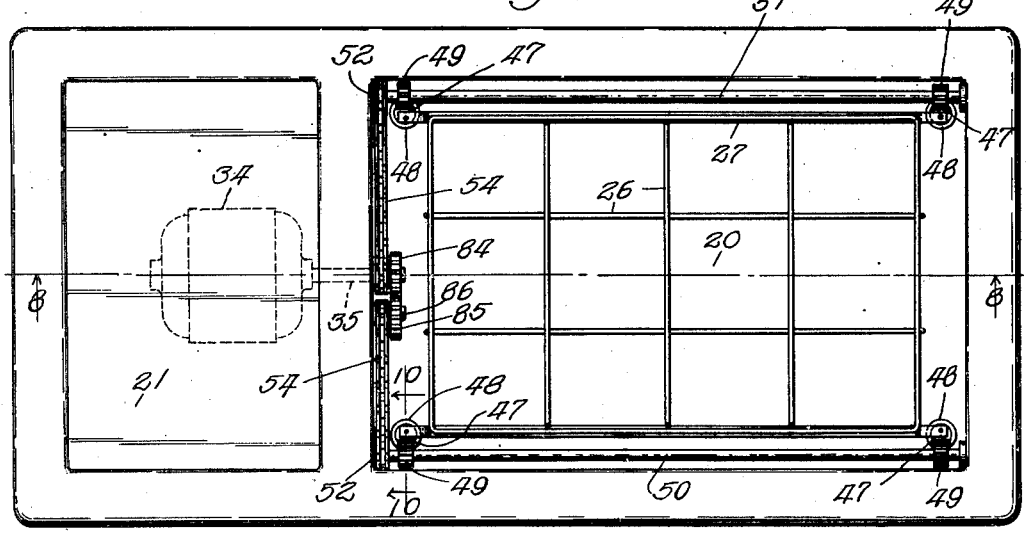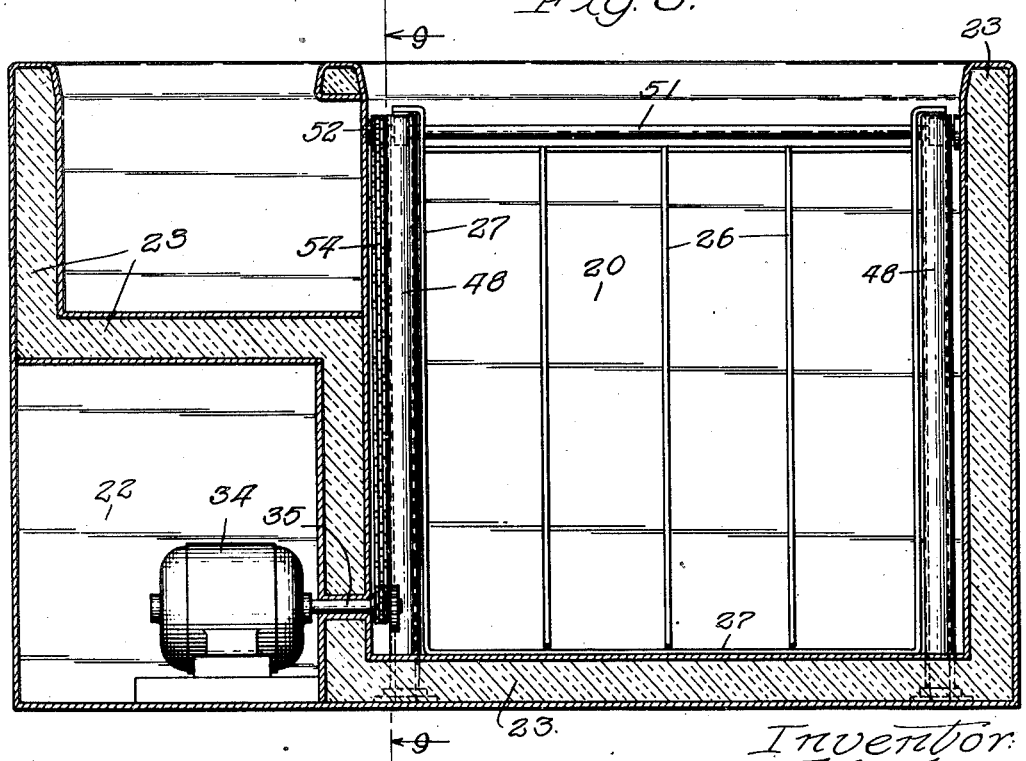

Aug. 2, 1949.　　　　M. F. WEBER　　　　2,478,145
REFRIGERATED FOOD STORAGE UNIT APPARATUS
Filed June 14, 1946　　　　　　　　　　7 Sheets-Sheet 5

Inventor:
Marcie F. Weber,
By Clinton, Schroeder, Merriam & Myers,
Attys.

Aug. 2, 1949.　　　　　M. F. WEBER　　　　　2,478,145
REFRIGERATED FOOD STORAGE UNIT APPARATUS
Filed June 14, 1946　　　　　　　　　　　7 Sheets-Sheet 6
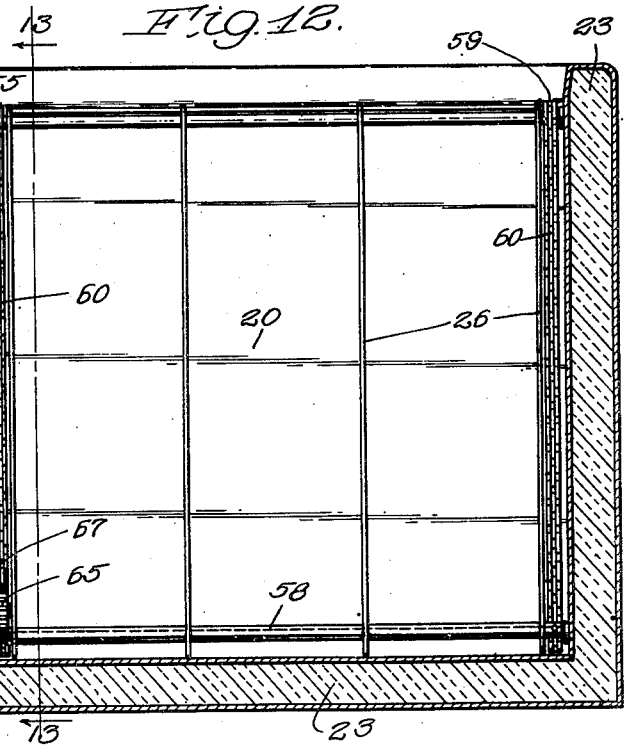
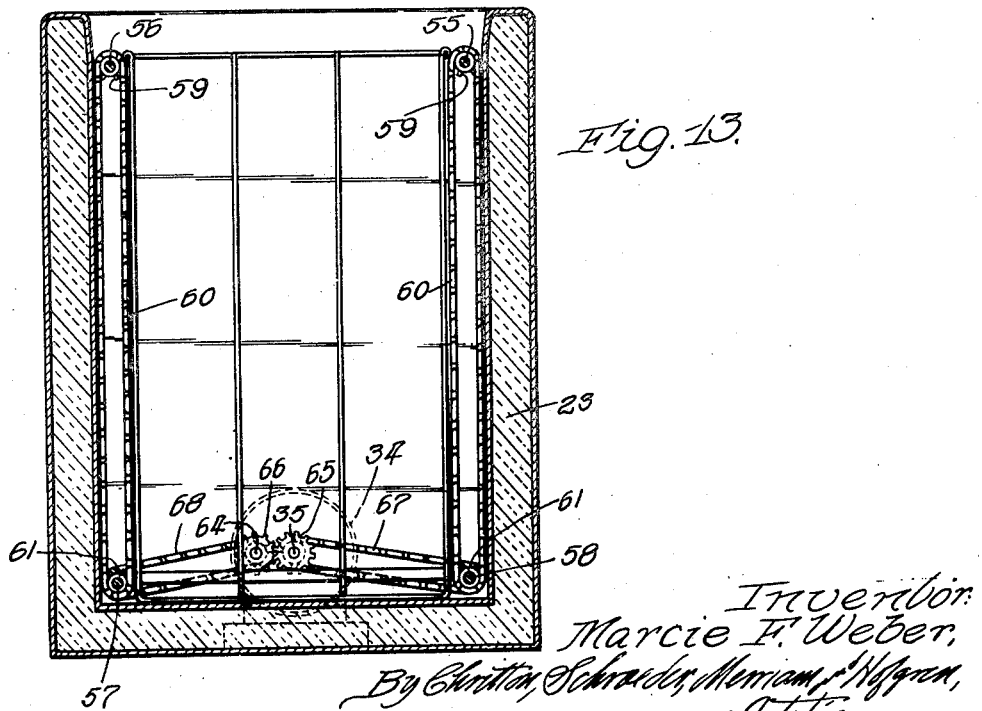
Inventor:
Marcie F. Weber,
By Chritten, Schraeder, Merriam, & Hoffman,
Attys.

Aug. 2, 1949.　　　　M. F. WEBER　　　　2,478,145
REFRIGERATED FOOD STORAGE UNIT APPARATUS
Filed June 14, 1946　　　　　　　　　7 Sheets-Sheet 7
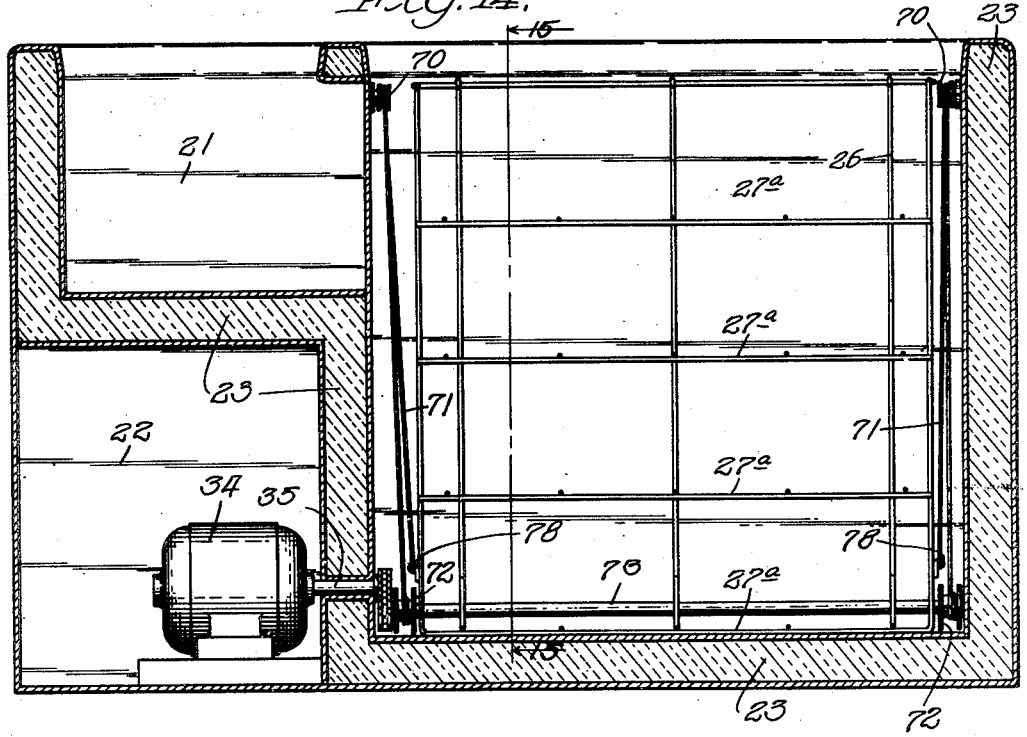
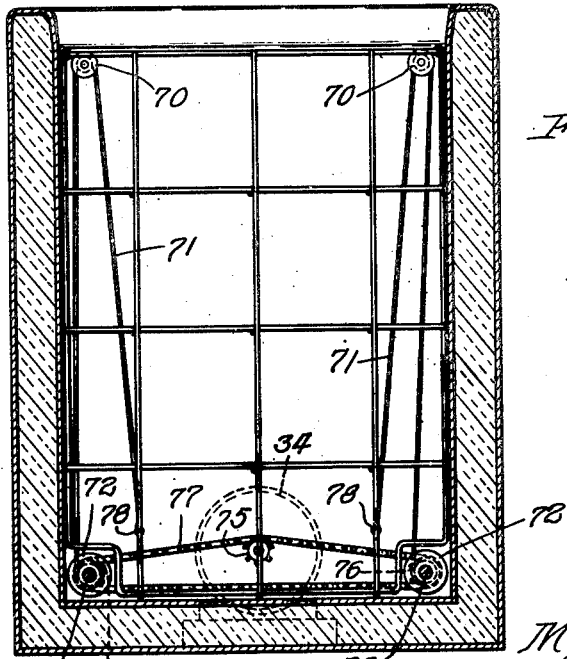

Patented Aug. 2, 1949

2,478,145

UNITED STATES PATENT OFFICE 2,478,145

REFRIGERATED FOOD STORAGE UNIT APPARATUS

Marcie F. Weber, Harvey, Ill.

Application June 14, 1946, Serial No. 676,746

4 Claims. (Cl. 312—176)

This invention relates to refrigerated food storage units such as the so-called deep-freeze units that are used for freezing and storing foods, and the invention relates particularly to a movable shelf structure within the food compartment with the shelf structure being raised and lowered by motor-operated mechanical means.

Refrigerated food storage units are widely used, as they are capable of storing frozen foods for long periods of time. They also freeze the food to preserve it. The ordinary family type units have large food compartments so that a several months' supply of food may be frozen and stored at one time. In these large food compartments it is difficult to arrange the food so that it is readily accessible, and it is necessary to sometimes move the individual packages of food in order to reach those at the bottom.

With the structure of the present invention there is provided one or more shelves upon which the food packages are stored, and these shelves are raised from the food compartment and lowered into it by mechanical means operated by a motor. This makes the food compartment much more accessible so that food may be more easily stored within the compartment, and individual packages of food may be more easily removed therefrom.

In this invention the shelf or shelves are raised from the food compartment by operation of the motor. The individual food packages are placed on the shelves and the entire shelf structure is then lowered into position within the food compartment. When it is desired to remove food packages the shelf structure is again raised from the food compartment so that the food is readily accessible.

The invention broadly comprises a power-operated vertically movable shelf structure within the food compartment of a refrigerated food storage unit having insulating walls and a top opening to the compartment. The power-operated shelf structure comprises a framework normally within the food compartment, a substantially horizontal shelf or shelves attached to said framework, a motor outside the food compartment in a non-refrigerated area, and means attached to said framework-shelf structure and operated by the motor for raising said framework and shelf out of the food compartment for ready access thereto.

Figure 10:
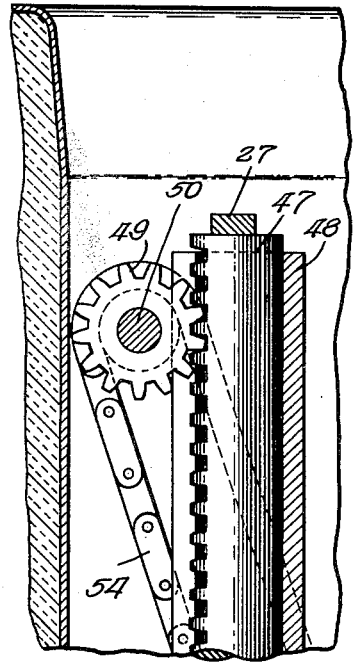
Figure 11:
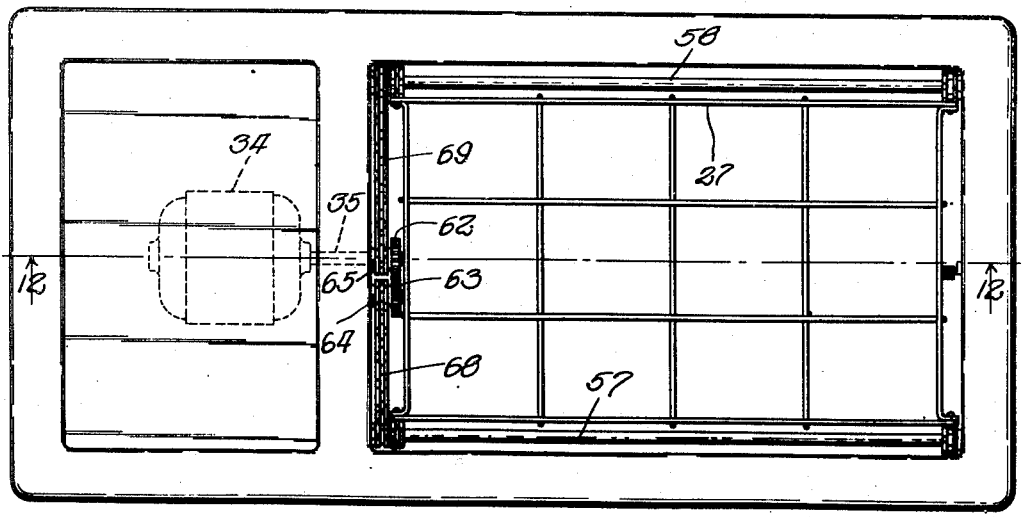

The invention will be described as related to the embodiment shown in the accompanying drawings. Of the drawings Fig. 1 is a plan view of one embodiment of the invention with the door to the food compartment removed; Fig. 2 is a vertical section taken along line 2—2 of Fig. 1 showing the food compartment door in position, and with a portion of the view broken away for clarity of illustration; Fig. 3 is a view similar to Fig. 2 showing the shelf structure in elevated position; Fig. 4 is a fragmentary enlarged vertical section taken along line 4—4 of Fig. 1; Fig. 5 is a view similar to Fig. 1 showing a second embodiment of the invention; Fig. 6 is a section taken along line 6—6 of Fig. 5; Fig. 7 is a plan view similar to Fig. 1 showing a third embodiment of the invention; Fig. 8 is a section taken along line 8—8 of Fig. 7; Fig. 9 is a section taken along line 9—9 of Fig. 8; Fig. 10 is an enlarged fragmentary section taken along line 10—10 of Fig. 7; Fig. 11 is a plan view similar to Fig. 1 showing a fourth embodiment of the invention; Fig. 12 is a section taken along line 12—12 of Fig. 11; Fig. 13 is a section taken along line 13—13 of Fig. 12; Fig. 14 is a vertical section showing a fifth embodiment of the invention; and Fig. 15 is a section taken along line 15—15 of Fig. 14.

The refrigerated food storage unit shown in the accompanying drawings comprises a food compartment 20, a food freezing compartment 21, a motor compressor compartment 22, insulation 23 surrounding the food compartment and the food freezing compartment and insulated doors 24 and 25 covering the top openings to the food compartment and the freezing compartment. The freezing compartment is equipped with freezing coils (not shown), and the motor compartment 22 is equipped with the usual compressor unit (not shown).

In the embodiment shown in Figs. 1 to 4 inclusive, there is provided a heavy wire framework 26 formed with a bottom shelf 27. The top of the framework 26 is attached at the corners to four vertical threaded posts 69. Each corner post 69 is surrounded by a housing 28 which is permanently secured to the food storage unit. A wheel 29 is mounted on the upper end of each housing 28 and is internally screw-threaded for cooperation with threaded posts 69 to turn said posts. Each wheel 29 bears against its housing 28, and is provided with external gear teeth 30. Each toothed wheel 29 is provided with a set screw 31 which engages an annular groove 32 in its housing 28 and retains the wheel on the housing. All four wheels 29 are engaged by an endless chain 33.

Within the compressor compartment 22 there is provided a motor 34 having a shaft 35 extending through the insulation 23. At the end of the shaft there is located a right angle bevel gear 36 which engages a similar bevel gear 37 that is attached to the bottom of a vertical rod 38. This rod is held for rotation by two brackets 39 and 40. At the top of the vertical rod 38 there is located a gear wheel 41, whose teeth engage the chain 33. Thus the motor 34 serves to move the chain 33, and this chain turns the wheels 29 to raise the threaded posts 69. These posts serve to raise the framework 26 and shelf 27. The usual type of control means is provided with the motor 34, so that by pushing a button the framework and shelf may be raised from the food compartment and then by pushing another button the framework and shelf may be lowered into the food compartment. The electrical control system is not shown, as it is purely conventional. As many shelves 27 may be provided on the framework as are desired.

In the embodiment shown in Figs. 5 and 6 the framework 26 is attached to the tops of four vertical pistons 42 with each piston surrounded by a cylinder 43. These pistons and cylinders are operated by fluid under pressure supplied from a motor-operated fluid compressor unit 44 through a manifold 45 and four fluid supply lines 46. Each fluid supply line communicates with a cylinder 43 beneath the piston 42. The fluid supplied may be a compressed gas, but is preferably liquid under pressure.

In the embodiment shown in Figs. 7, 8, 9 and 10, the framework 26 is fastened to the tops of four substantially vertical racks 47 with each rack being surrounded by a housing 48 and engaged by a pinion 49 near the top of the rack. The two pinions on one side of the food compartment are mounted on a horizontal rotatable rod 50 extending the full length of the food compartment. The other two pinions are mounted on a second rod 51 substantially parallel to the first rod. Each rod 50 and 51 is journalled in suitable bearings in the opposite walls of the food compartment. Each rod 50 and 51 is provided with a toothed gear wheel 52 on the ends of the rods adjacent the motor 34. The motor shaft 35 is also provided with a toothed gear wheel 53 and a gear 84 meshing with a second gear 85 mounted on a short rod 86. The short rod is provided with a gear wheel 87. A chain 54 passes around gear wheel 53 and one gear wheel 52, while a second chain passes around gear wheel 87 and the other gear wheel 52. The motor 34 serves to raise and lower the framework 26 and shelf 27 by means of the racks 47 and pinions 49. The housing 48 surrounding each rack 47 is cut away to expose the teeth of the rack for engagement with the teeth of the pinion.

In the embodiment shown in Figs. 11, 12, and 13 there are provided four horizontal parallel rotatable rods 55, 56, 57, and 58 extending the full length of the food compartment 20. Two of these rods, 55 and 56, are at the top of the food compartment, while the other two rods, 57 and 58, are at the bottom of the food compartment. The two rods on one side, 55 and 58, are aligned substantially vertically, and the other two rods, 56 and 57, are also thusly aligned. Each rod is provided with a gear wheel 59 near its ends, and each pair of vertically aligned gear wheels 59 is provided with an endless chain 60. The two bottom rods, 57 and 58, are provided with additional gear wheels 61 on their ends adjacent the motor 34. The motor shaft 35 which extends through the insulation 23 is provided with a gear wheel 62 meshing with a second gear wheel 63 that is mounted on a short rod 64 located adjacent and parallel to the shaft 35. The shaft 35 is also provided with a sprocket wheel 65, while the short rod 64 is also provided with a sprocket wheel 66. The sprocket wheel 65 and the toothed wheel 61 on the end of rod 58 adjacent the motor are connected by an endless chain 67. The sprocket wheel 66 on the short rod 64 and its adjacent toothed wheel 61 are also connected by a short chain 68. Each of the vertical chains 60 is attached to the framework 26 near the bottom thereof, so that the framework 26 and shelf 27 may be raised and lowered.

In the embodiment shown in Figs. 14 and 15 there are provided a plurality of vertically spaced shelves 27a intsead of the one shelf 27 shown in the other embodiments. All embodiments may have one or more shelves. In this final embodiment there are provided four sheaves 70, one near each top corner of the food compartment. A flexible member 71, such as a cord or the like, is fastened as by eyelet 78 near the bottom of a corner of the framework 26 and extends up over a sheave 70 and down to a spindle 72. Each spindle 72 is located in a bottom corner of the food compartment, and the two spindles on one side are mounted on the shaft 73, while the spindles on the other side are mounted on the second shaft 74. These shafts 73 and 74 are substantially parallel and horizontal. The end of the motor shaft 35 is provided with a sprocket wheel 75, while the ends of the horizontal shafts 73 and 74 adjacent the motor are provided with sprocket wheels 76. All three sprocket wheels 75 and 76 are in a substantially vertical plane, and are connected by an endless chain 77. The motor 34 serves to turn its shaft 35 and sprocket wheels 75 and 76, and this causes the spindles 72 to turn and wind up the flexible members 71, thereby raising the framework 26 and shelves 27a from the food compartment. By reversing the motor the framework and shelves are lowered into the food compartment.

Having described my invention as related to the embodiments shown in the accompanying drawings, it is my intention that the invention be not limited by any of the details of description unless otherwise specified, but rather be construed broadly within its spirit and scope as set out in the accompanying claims.

I claim:

1. In a refrigerated food storage unit comprising an insulated food compartment, a power-operated vertically movable shelf structure comprising a framework within the food compartment, a substantially horizontal shelf attached to said framework, substantially vertical non-rotatable threaded posts positioned at the corners of the food compartment and extending from the bottom of the compartment to points near the top thereof with the framework attached to the posts near the tops thereof, a housing surrounding each post, an internally-threaded rotatable wheel engaging the threads on each post, a motor outside the food compartment in a non-refrigerated area, a shaft extending through the insulation and operated by the motor, and mechanical means operated by the shaft for turning the threaded wheels to raise the threaded posts, framework and shelf.

2. The power-operated shelf structure of claim 1 wherein there is provided an endless flexible member extending around the top of the food compartment and engaging the threaded wheels and the mechanical means engages the flexible member to drive it and thereby turn the wheels and raise the threaded posts, framework, and shelf from the food compartment.

3. The power-operated shelf structure of claim 1 wherein the threaded wheels bear against the tops of the housings to fix them in position.

4. The power-operated shelf structure of claim 1 wherein the threaded wheels are toothed gear wheels and there is provided an endless chain extending around the top of the food compartment and engaging the teeth on the gear wheels, and the mechanical means comprises a vertical rotatable rod extending from the compartment end of said shaft to the chain, a gear wheel on said end of the shaft, a second gear wheel on the rod engaging the first gear wheel, and a third gear wheel on the opposite end of the shaft engaging the chain for moving the same and raising the threaded rods, framework and shelf from the food compartment.

MARCIE F. WEBER.

REFERENCES CITED

The following references are of record in the file of this patent:

UNITED STATES PATENTS

| Number | Name | Date |
|---|---|---|
| 632,680 | Fisher | Sept. 5, 1899 |
| 829,011 | Horner | Aug. 21, 1906 |
| 1,546,727 | Goldman | July 21, 1925 |
| 1,920,825 | Williams | Aug. 1, 1933 |
| 2,096,256 | Mitchell | Oct. 19, 1937 |